US012123424B1

(12) United States Patent
Yang

(10) Patent No.: US 12,123,424 B1
(45) Date of Patent: Oct. 22, 2024

(54) FAN LIGHT

(71) Applicant: Zhifa Yang, Huaihua (CN)

(72) Inventor: Zhifa Yang, Huaihua (CN)

( * ) Notice: Subject to any disclaimer, the term of this patent is extended or adjusted under 35 U.S.C. 154(b) by 0 days.

(21) Appl. No.: 18/589,662

(22) Filed: Feb. 28, 2024

(30) Foreign Application Priority Data

Jan. 10, 2024 (CN) ......................... 202420054547.9
Jan. 22, 2024 (CN) ......................... 202420155270.9

(51) Int. Cl.

| | |
|---|---|
| ***F04D 25/08*** | (2006.01) |
| ***F04D 29/64*** | (2006.01) |
| ***F21V 33/00*** | (2006.01) |
| *F21Y 115/10* | (2016.01) |

(52) U.S. Cl.
CPC ......... *F04D 25/088* (2013.01); *F04D 29/644* (2013.01); *F21V 33/0096* (2013.01); *F21Y 2115/10* (2016.08)

(58) Field of Classification Search
CPC ... F04D 25/088; F04D 29/644; F21V 33/0096
See application file for complete search history.

(56) References Cited

U.S. PATENT DOCUMENTS 11,933,482 B1 * 3/2024 He ...................... F21V 33/0096
2020/0208809 A1 * 7/2020 Zhang ..................... F21S 8/063

* cited by examiner

*Primary Examiner* — Karabi Guharay
(74) *Attorney, Agent, or Firm* — Jeenam Park

(57) ABSTRACT

The present application provides a fan light including a suspension bracket seat configured to fix and a fan light body connected to the suspension bracket seat. The suspension bracket seat is provided with a conductive threaded groove, the fan light body is provided with a conductive connection structure that can be matched and electrically connected with the threaded groove thread. The suspension bracket seat is further provided with a fixed structure configured to fix the fan light body to the suspension bracket seat. Through a cooperation of conductive connection structure and threaded groove, the fan light body can be electrically connected to the suspension bracket seat. When the fan needs to be reversed, the fixed structure can ensure that the fan light body is firmly fixed on the suspension bracket seat, thereby increasing safety, reducing a risk of accidental detachment or shaking, increasing flexibility and practicality.

15 Claims, 7 Drawing Sheets

FAN LIGHT

CROSS-REFERENCE TO RELATED APPLICATIONS

This application claims priority to Chinese Patent Application No. 202420155270.9, filed on Jan. 22, 2024 and Chinese Patent Application No. 202420054547.9, filed on Jan. 10, 2024. Both of the above-mentioned applications are hereby incorporated by reference in their entireties.

TECHNICAL FIELD

The present disclosure relates to the field of fan lights technologies, and in particular, to a fan light.

BACKGROUND

Fan light is a type of light that combines lighting and ventilation functions. It can provide cool air in summer while also providing lighting. Fan light usually uses a LED light strip as lighting source. LED light has characteristics of energy conservation and long service life, so it is widely used.

The main technologies of fan light include a design and manufacturing of a fan body, a selection of a drive motor, and a design of a drive power supply. The design of the fan body needs to consider ventilation effect and noise control, as well as aesthetics and installation convenience. The selection of the drive motor needs to consider factors such as power size, speed, and durability, while the design of the drive power supply needs to consider the power supply stability and power conversion efficiency of LED strip.

At present, there are two main connection modes for fan light on the market. One is to use wires to directly connect a plug, which is not easy to install and disassemble. The other is to use a fan light with a light head for lifting connection. This connection mode is convenient for installation and disassembly, but cannot achieve forward and reverse functions of the fan. When the fan light is reversed, it is easy to drive the light head to loosen the entire light body and a light holder, as a result, it falls and endangers personal safety.

SUMMARY

The present application aims to solve the problem that the connection mode of the fan light in the prior art is not convenient for installation and disassembly, and the fan light with a light head cannot achieve the forward and reverse functions of the fan. It provides a fan light that is easy to disassemble and can rotate forward and reverse.

A fan light including a suspension bracket seat configured to fix and a fan light body connected to the suspension bracket seat, where the suspension bracket seat is provided with a conductive threaded groove, the fan light body is provided with a conductive connection structure that is matched and electrically connected with the threaded groove; the suspension bracket seat is further provided with a fixed structure configured to fix the fan light body to the suspension bracket seat.

In the fan light, the fixed structure includes a through hole located on one side of the suspension bracket seat near the conductive connection structure, a fix member located inside the through hole and provided on a top of the conductive connection structure.

In the fan light, the conductive connection structure includes a conductive body that is threaded with the suspension bracket seat, and a fix portion integrally formed with the conductive body and provided at a lower side of the conductive body; the fix member runs through the suspension bracket seat and is provided on a top of the fix portion.

In the fan light, fix portion is further provided with a first fixing hole corresponding to the fix member, the first fixing hole is configured to insert the fix member; the fix member runs through the through hole and is inserted to the first fixing hole.

In the fan light, the fixed structure is provided with multiple fixed structures, the multiple fixed structures are respectively provided on a periphery of the suspension bracket seat.

In the fan light, the conductive body is any one of B22 light head, E12 light head, E14 light head, E26 light head, and E27 light head.

In the fan light, the fan light body includes a fan assembly and a luminous element that can be electrically connected to the conductive connection structure respectively; the fan assembly includes a casing located on a lower side of the conductive connection structure, several fan blades provided on a periphery of the casing, a drive component provided in the casing and configured to drive the fan assembly to rotate.

In the fan light, the drive component includes a drive motor located within the casing, and an installation piece sleeved on the drive motor and configured to fix the drive motor to the casing; a control circuit board is further provided on an upper side of the installation piece, the drive motor can be electrically connected to the control circuit board.

In the fan light, the installation piece includes a first installation part located on a lower side of the control circuit board and configured to fix on the casing, and a second installation part located on a lower side of the first installation part for inserting and connecting the drive motor; the first installation part and the second installation part are integrally formed.

In the fan light, an insertion hole is provided on the second installation part corresponding to the drive motor and configured to insert the drive motor.

In the fan light, the drive motor includes a fixed shaft penetrating the insertion hole, and a rotation member that rotates around a peripheral side of the fixed shaft, the rotation member is fixed to the casing to drive the drive motor to rotate the fan blades.

In the fan light, the first installation part is provided with multiple fixed columns, the fixed columns can be fixedly connected to the casing; the control circuit board is further provided with a positioning hole corresponding to the fixed column for inserting the fixed column.

In the fan light, a flange extending away from the fixed column is further provided on a periphery of multiple fixed columns, a lower side of the control circuit board is provided on the flange.

In the fan light, the suspension bracket seat further includes an extension rod, one end of the extension rod is provided with a first connection part that can be matched and electrically connected with the threaded groove; one end of the extension rod far away from the first connection part is provided with a second connection part that can be matched and electrically connected with the conductive connection structure.

In the fan light, both the first connection part and the second connection part are provided with a connection hole, the connection hole is configured to insert the fix member.

Compared with existing technology, the beneficial effects of the present application are as follows:

The present application provides a fan light, which can be electrically connected to a suspension bracket seat through a conductive connection structure and a threaded groove. When the fan needs to be reversed, the fixed structure can ensure that the fan light body is firmly fixed on the suspension bracket seat, thereby increasing safety, reducing the risk of accidental detachment or shaking, increasing flexibility and practicality. A conductive threaded groove and conductive connection structure are adopted, it can ensure good electrical connection and ensure a normal use and safety of the fan light.

BRIEF DESCRIPTION OF DRAWINGS

In order to provide a clearer explanation of the technical solution in the embodiments of the present application, a brief introduction will be given below to the drawings required in the description of the embodiments.

DESCRIPTION OF EMBODIMENTS

Figure 1:
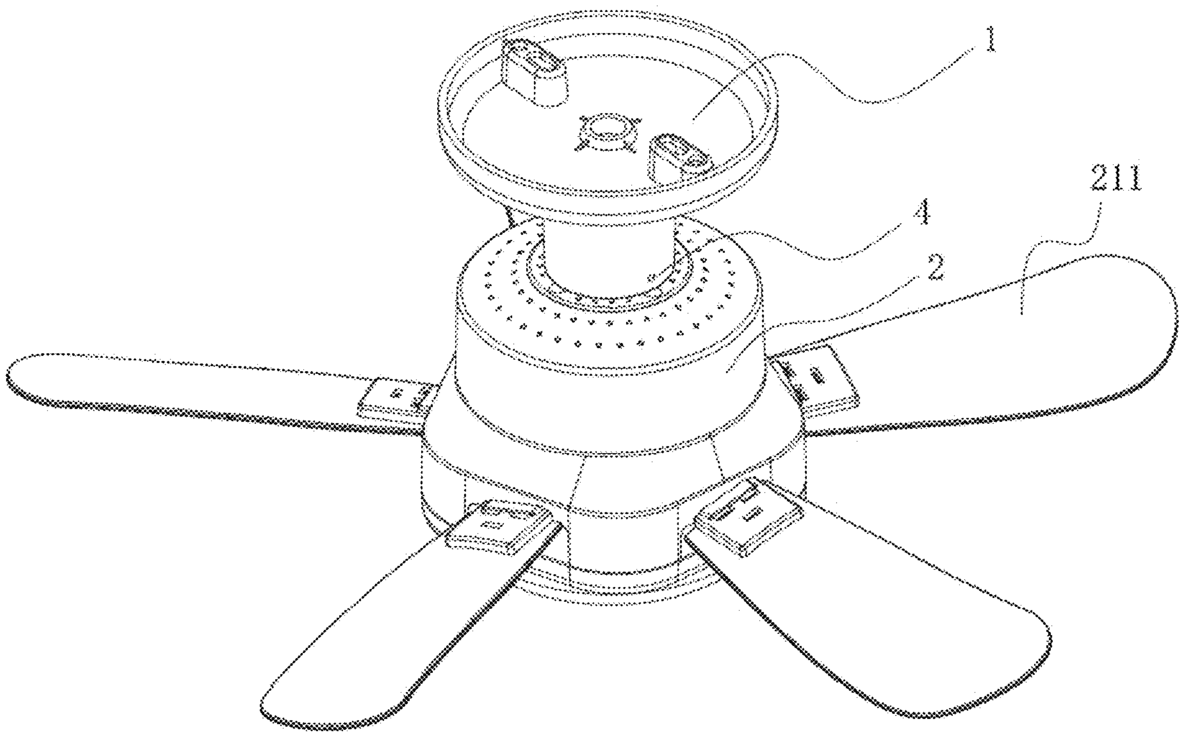
FIG. 1 is a three-dimensional schematic diagram of an assembly of a fan light of the present application.
Figure 2:
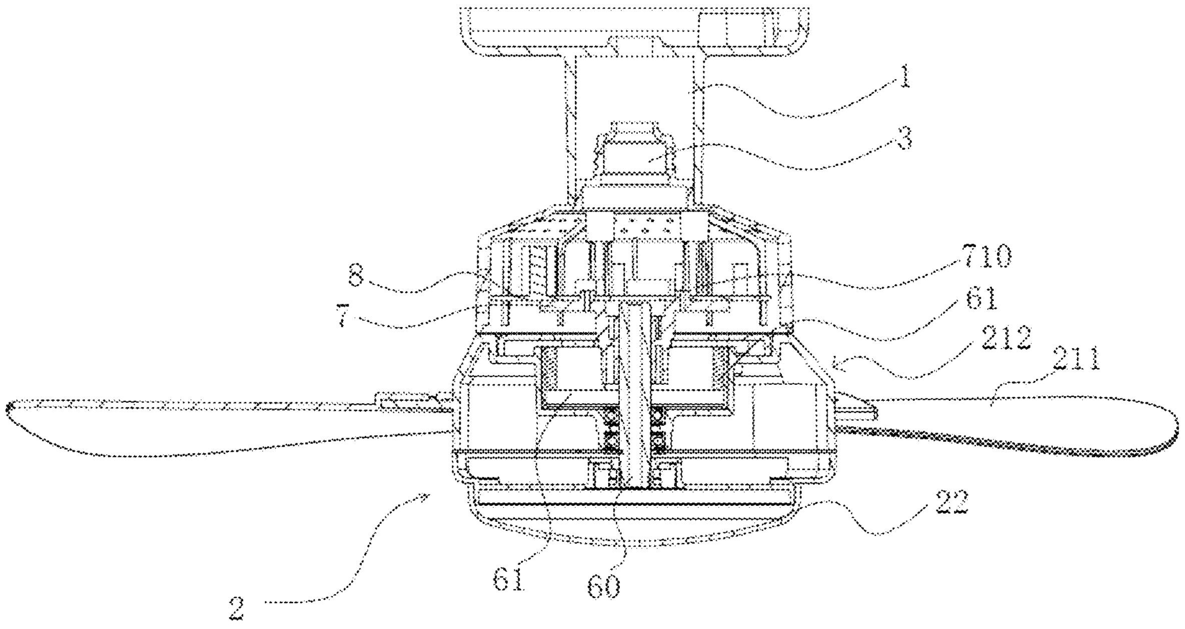
FIG. 2 is a cross-sectional view of the fan light of the present application.

The following is a further explanation of the present disclosure in combination with the drawings.

As shown in FIGS. 1-7, a fan light includes a suspension bracket seat 1, a threaded groove 10, a fan light body 2, a fan assembly 21, a casing 210, a fan blade 211, a drive component 212, a luminous element 22, a conductive connection structure 3, a conductive body 30, a fix portion 31, a fixed structure 4, a through hole 40, a fix member 41, an extension rod 5, a first connection part 50, a connection hole 51, a second connection part 52, a drive motor 6, a fixed shaft 60, a rotation member 61, an installation piece 7, and a first installation part 71, a fixed column 710, a flange 711, a second installation part 72, an insertion hole 721, a control circuit board 8 and a positioning hole 80.

A fan light includes the suspension bracket seat 1 configured to fix and the fan light body 2 connected to the suspension bracket seat 1. The suspension bracket seat 1 is provided with the conductive threaded groove 10, the fan light body 2 is provided with the conductive connection structure 3 that is matched and electrically connected with the threaded groove 10. The suspension bracket seat 1 is further provided the fixed structure 4 configured to fix the fan light body 2 to the suspension bracket seat 1, by a combination of the conductive connection structure 3 and the threaded groove 10, the fan light body 2 can be electrically connected to the suspension bracket seat 1. When the fan needs to be reversed, the fixed structure 4 can ensure that the fan light body 2 is firmly fixed on the suspension bracket seat 1, thereby increasing safety, reducing a risk of accidental detachment or shaking, increasing flexibility and practicality. When the conductive threaded groove 10 and conductive connection structure 3 are used, it can ensure good electrical connection and ensure the normal use and safety of fan light.

As an optional embodiment, the fixed structure 4 includes a through hole 40 located on one side of the suspension bracket seat 1 near the conductive connection structure 3, and a fix member 41 located inside the through hole 40 and provided on a top of the conductive connection structure 3. In an implementation mode, the fix member 41 can be a screw or a pin, and the fix member 41 can be fixed on the conductive connection structure 3 to fix the fan light body 2 on the suspension bracket seat 1, providing with the through hole 40 can ensure that the fix member 41 can be provided on top of the conductive connection structure 3, increasing the stability and firmness of the fixation, effectively avoiding the loosening or detachment of the fan light during use, and improving the safety of use.

As an optional embodiment, the conductive connection structure 3 includes a conductive body 30 that can be threaded with the suspension bracket seat 1, and a fix portion 31 that is integrally formed with the conductive body 30 and provided at a lower side of the conductive body 30. The fix member 41 runs through the suspension bracket seat 1 and is provided on a top of the fix portion 31. An integrated design of the fix portion 31 can provide additional support, increasing the stability and firmness of the connection. The fix member 41 can be threaded through the suspension bracket seat 1 and provided on the top of the fix portion 31, which simplifies the installation process and renders installation more convenient and efficient.

As an optional embodiment, the fix portion 31 is further provided with a first fixing hole 310 corresponding to the fix member 41 for insertion. The fix member 41 runs through the through hole 40 and is inserted to the first fixing hole 310. When the fix member is a pin, it can be inserted into the first fixing hole. When the fix member is a screw, it can be provided on the top of the fix member or inserted into the fixing hole, which is convenient and fast, the fix member 41 can be simultaneously fixed to the fix portion 31, thereby more firmly fixing the fan light body 2 to the suspension bracket seat 1.

Figure 3:
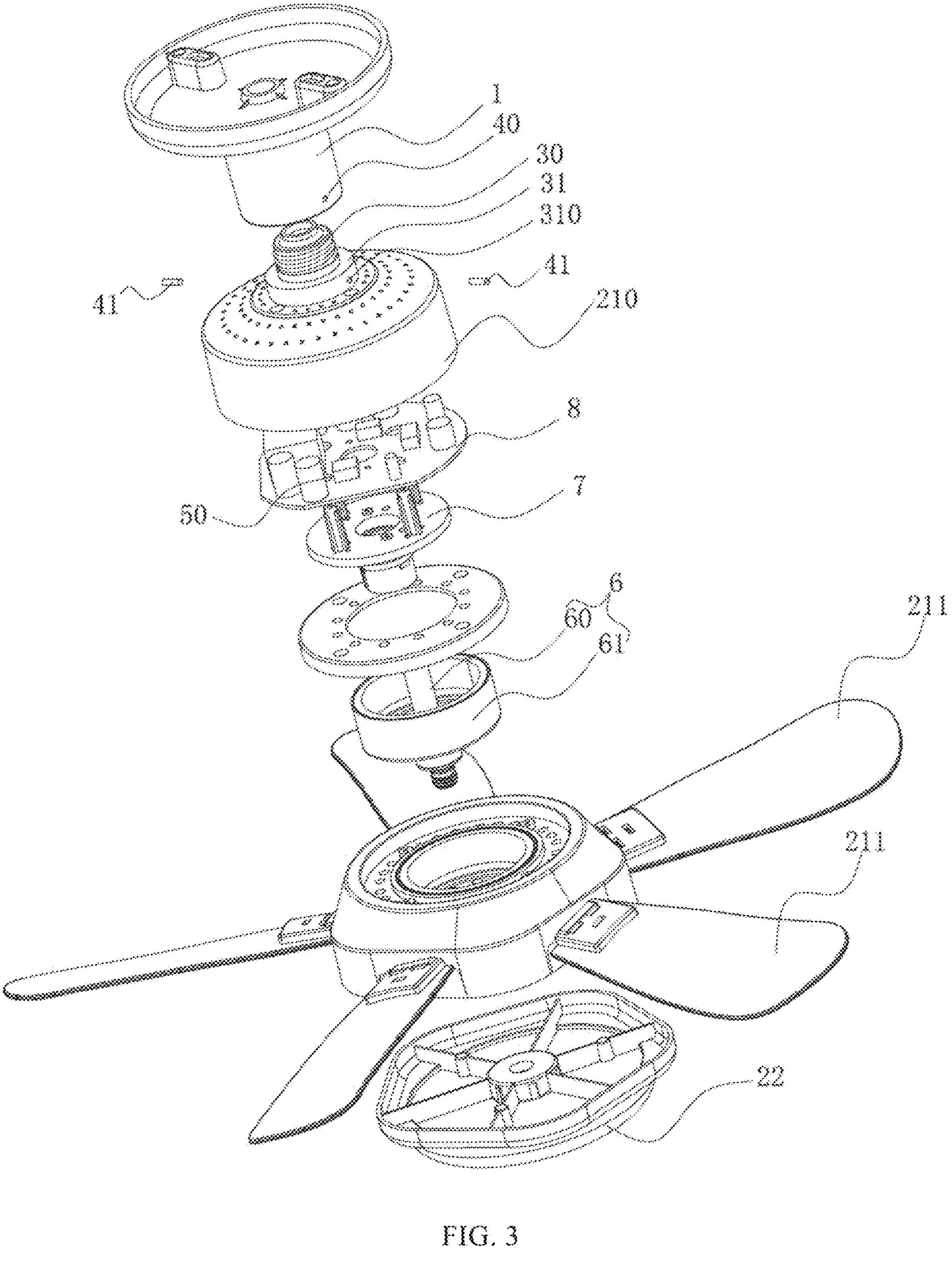
FIG. 3 is an exploded view of the fan light of the present application.
Figure 4:
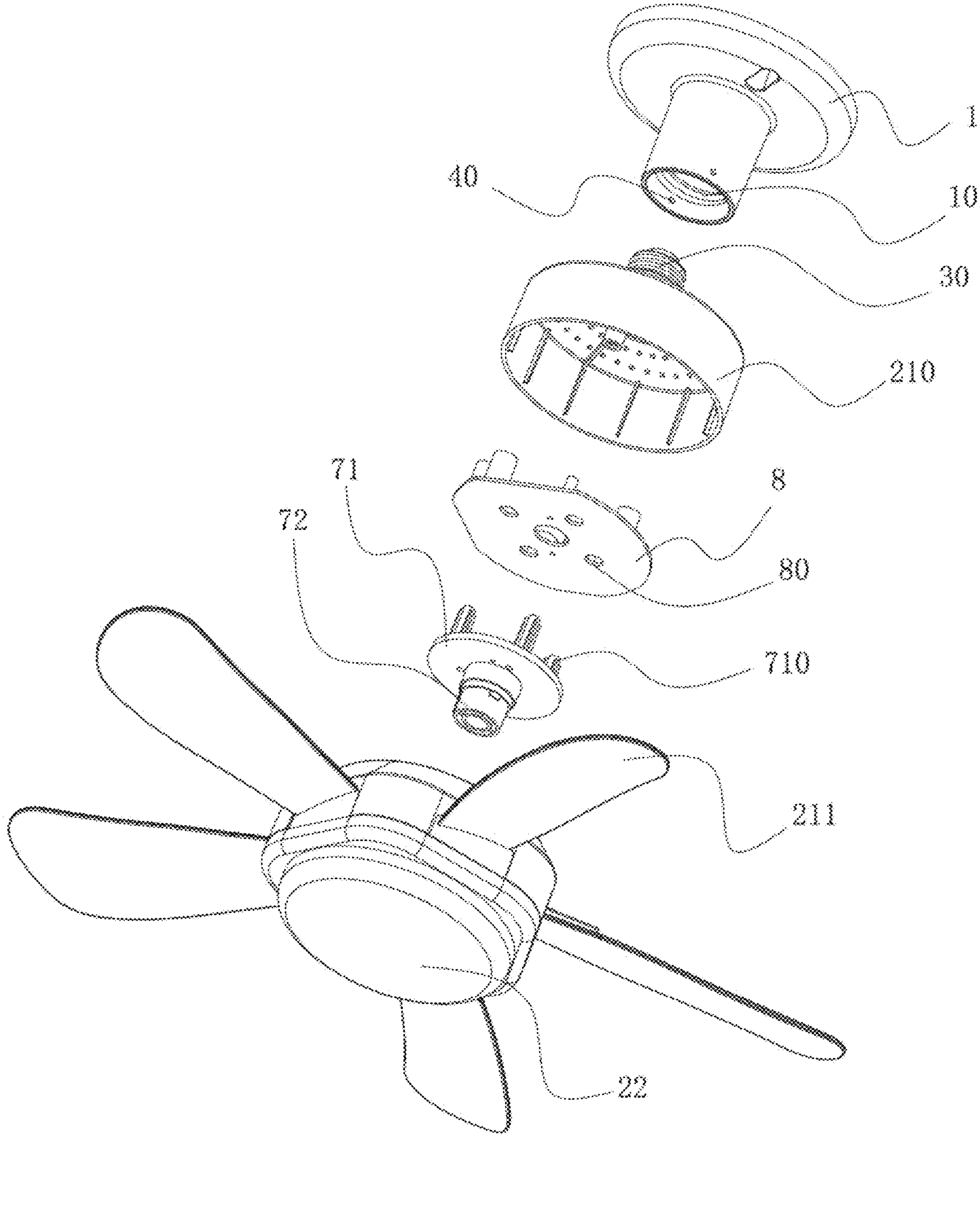
FIG. 4 is an exploded view of another perspective of the fan light of the present application.
Figure 5:
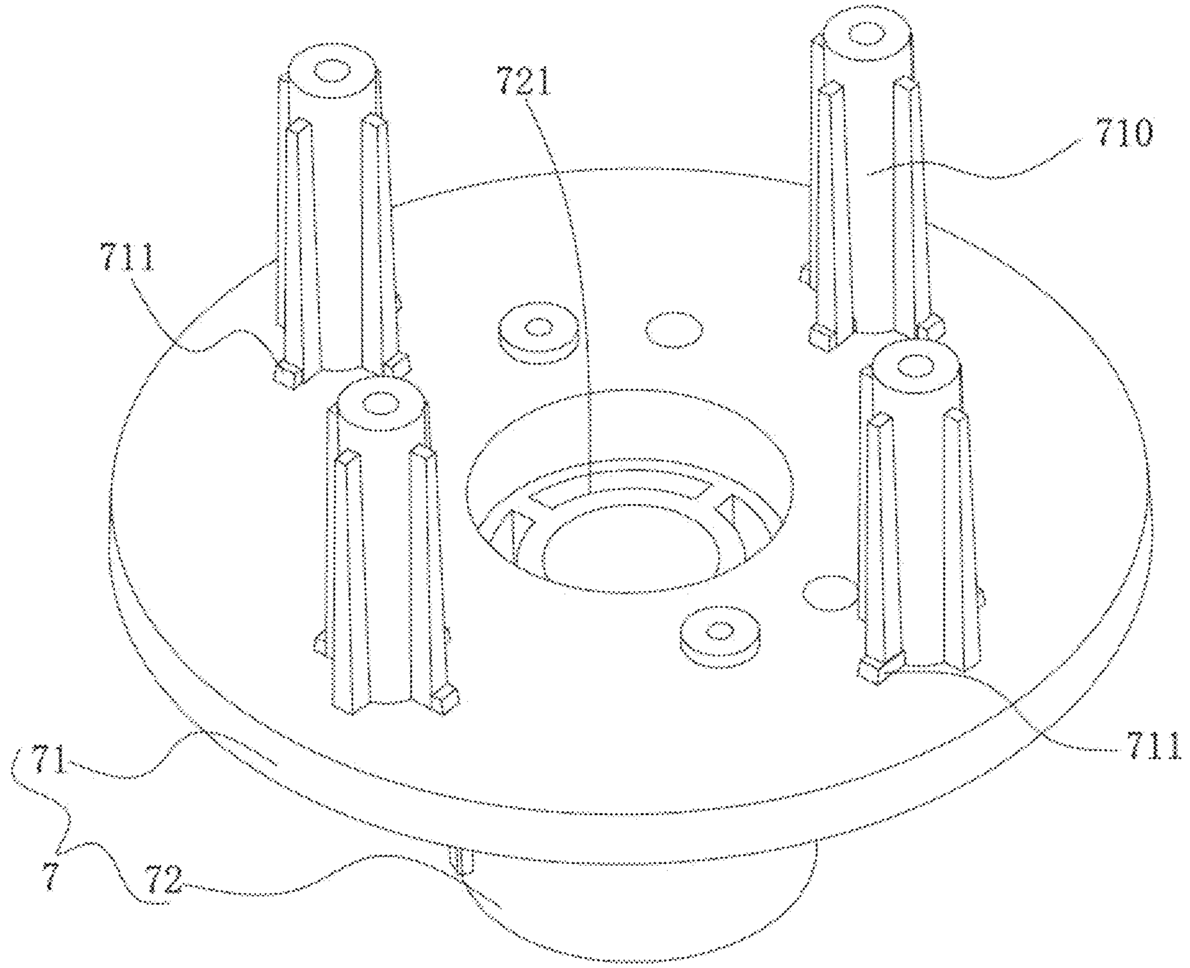
FIG. 5 is an exploded view of an assembly of an extension rod of the fan light of the present application.
Figure 6:
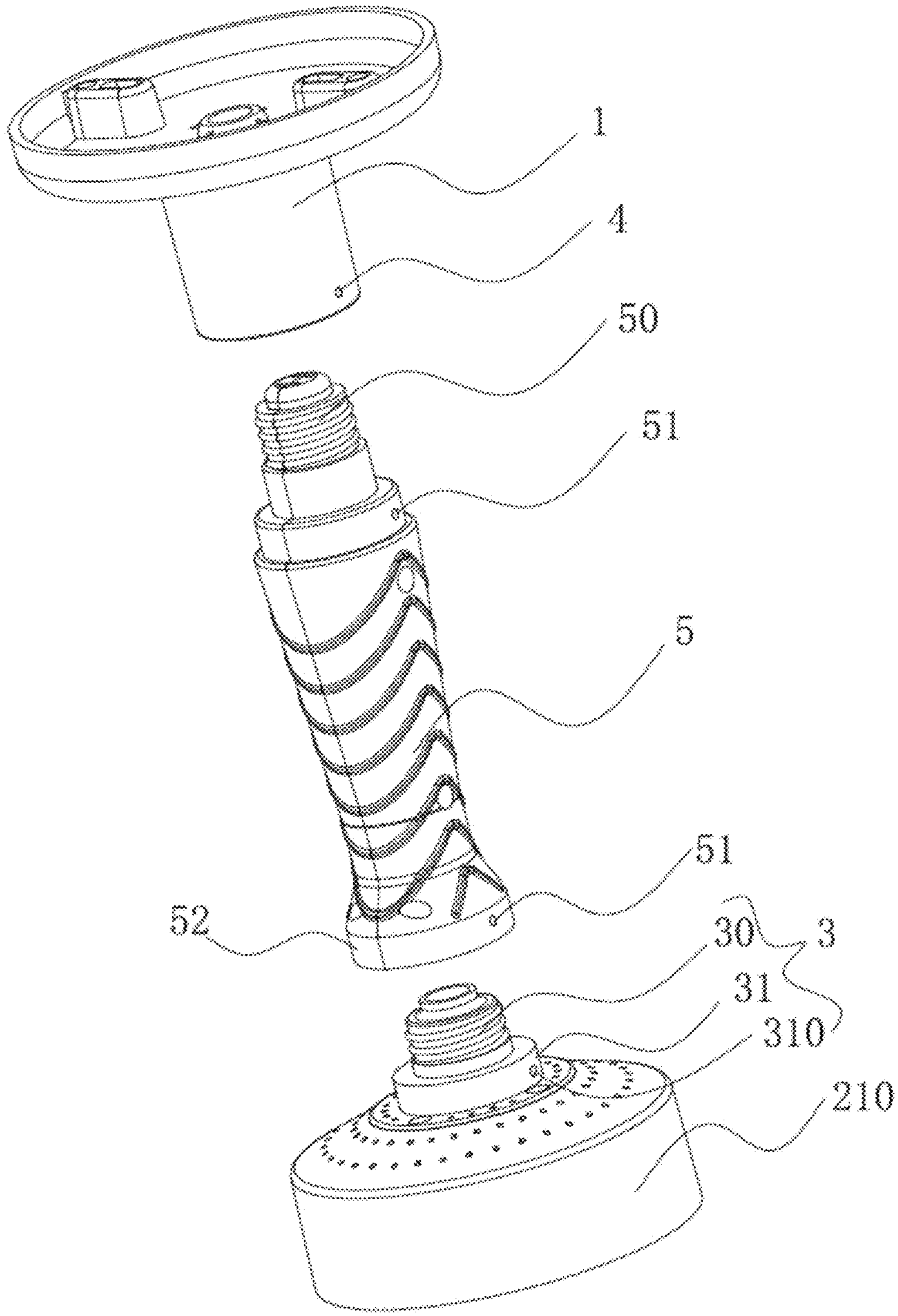
FIG. 6 is an assembly diagram of the extension rod of the fan light of the present application.
Figure 7:
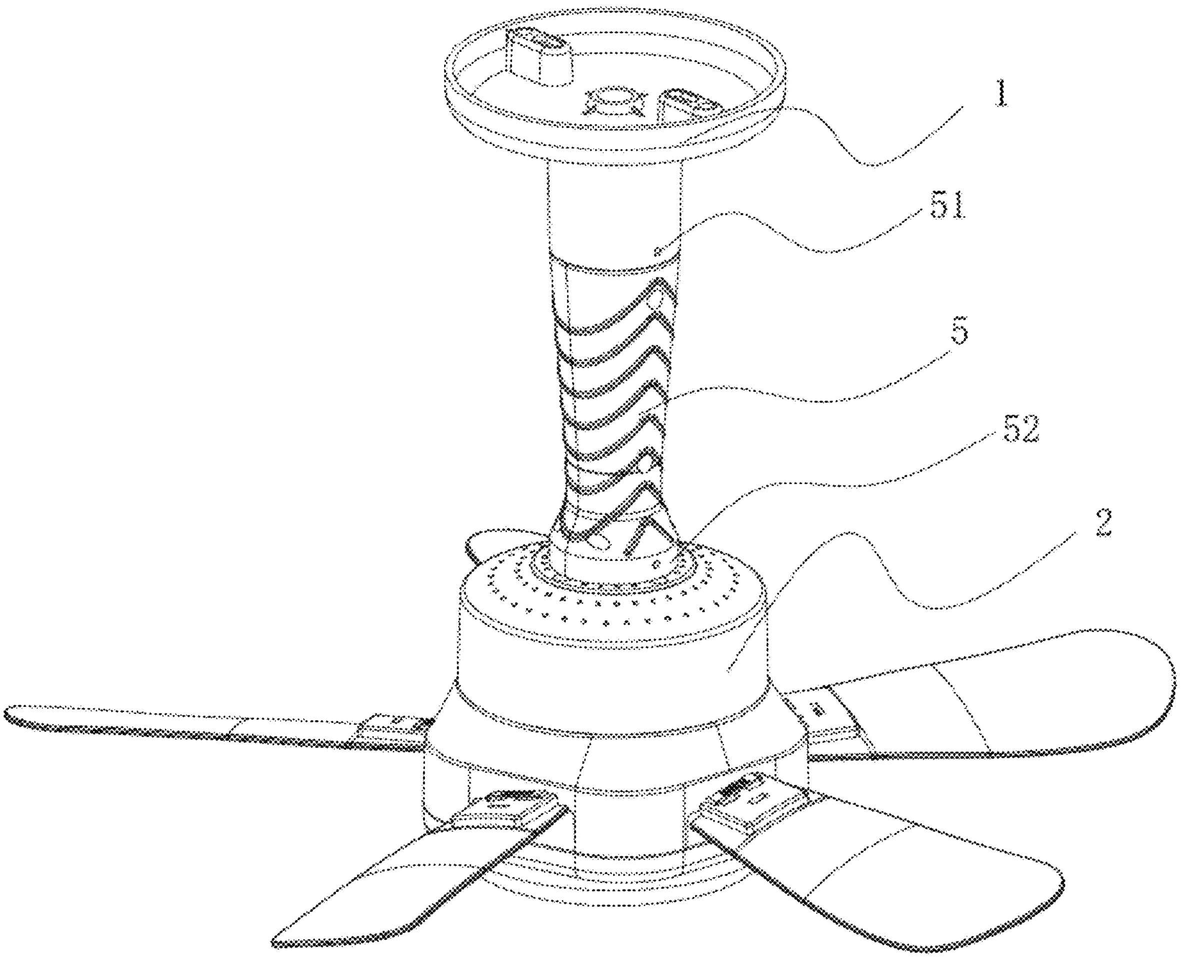
FIG. 7 is another assembly diagram of the extension rod of the fan light of the present application.

As an optional embodiment, as shown in FIG. 3, the fixed structure 4 is provided with multiple fixed structures, which are respectively located on a peripheral side of the suspension bracket seat 1. In an implementation mode, the fixed structure can have two fixed structures symmetrically located on the peripheral side of the suspension bracket seat. When the fix member is a screw, it can be provided in the two fixing holes to clamp the fan light body into the suspension bracket seat.

As an optional embodiment, the conductive body 30 is any one of B22 light head, E12 light head, E14 light head, E26 light head, and E27 light head.

As an optional embodiment, the fan light body 2 includes a fan assembly 21 and a luminous element 22 that can be electrically connected to the conductive connection structure 3 respectively. The fan assembly 21 includes a casing 210 located on a lower side of the conductive connection structure 3, several fan blades 211 provided on a periphery of the casing 210, a drive component 212 provided in the casing 210 and configured to drive the fan assembly 21 to rotate, which is connected through the conductive connection structure 3, fan assembly 21 and luminous element 22 can be connected to the power supply separately, achieving independent control and power supply of the fan and light. The switch and brightness of the fan and light can be flexibly controlled, improving the convenience of use. Fan light body 2 integrates lighting and ventilation functions, and independent electrical connection is achieved through conductive connection structure 3, which has flexibility and efficiency, and improves the overall user experience.

As an optional embodiment, the drive component 212 includes a drive motor 6 located inside the casing 210, and an installation piece 7 sleeved on the drive motor 6 and configured to fix the drive motor 6 to the casing 210. An upper side of the installation piece 7 is further provided with the control circuit board 8, the drive motor 6 can be electrically connected to the control circuit board 8 by connecting the drive motor of the fan light body. The installation components and control circuit board are integrated together, rendering assembly easier and faster, reducing installation complexity and time costs. The integrated design makes an overall structure of the fan light body more compact, occupying less space, not only eliminating bearings, but also reducing costs, reducing assembly time, and high practicality.

As an optional embodiment, the installation piece 7 includes a first installation part 71 located on a lower side of the control circuit board 8 and configured to fix on the casing 210, and a second installation part 72 located on a lower side of the first installation part 71 for inserting and connecting the drive motor 6. The first installation part 71 is integrated with the second installation part 72, and the integrated design ensures the stability and structural strength of the installation component, rendering the entire fan light component to be sturdier and more reliable. The design of the second installation part 72 renders it easy to insert and cooperate with the drive motor 6, simplifying the assembly process and improving assembly efficiency. The integrated design reduces the number of components, reduces manufacturing costs while also reducing potential failure points, which is beneficial for improving product reliability.

As an optional embodiment, the second installation part 72 is provided with an insertion hole 721 corresponding to the drive motor 6 for insertion. The design of the insertion hole 721 can effectively utilize space, allowing the drive motor 6 to be tightly connected to the installation piece 7, which is conducive to the compactness and stability of the overall structure, ensuring accurate positioning when the drive motor 6 is inserted, and ensuring a stable connection between the drive motor 6 and the installation piece 7.

As an optional embodiment, the drive motor 6 includes a fixed shaft 60 penetrating the insertion hole 721, and a rotation member 61 that rotates around a peripheral side of the fixed shaft 60. The rotation member 61 is fixed to the casing 210 to enable the drive motor 6 to drive the fan blades 211 to rotate.

As an optional embodiment, the first installation part 71 is provided with multiple fixed columns 710, the multiple fixed columns 710 can be fixedly connected to the casing 210. The control circuit board 8 is further provided with the positioning hole 80 corresponding to the fixed column 710 for inserting the fixed column 710, facilitating the positioning assembly between the control circuit board and the installation component.

As an optional embodiment, multiple fixed columns 710 are further provided with a flange 711 extending in a direction away from the fixed columns 710. A lower side of the control circuit board 8 is provided on the flange 711. By setting the lower side of the control circuit board to be provided on the flange, a gap is formed between the control circuit board and the installation component to facilitate the control of circuit board heat dissipation. In an implementation mode, there are four fixed columns.

As an optional embodiment, the suspension bracket seat 1 further includes an extension rod 5, one end of which is provided with a first connection part 50 that can be matched and electrically connected with the threaded groove 10, one end of the extension rod 5 away from the first connection part 50 is provided with a second connection part 52 that can be matched and electrically connected with the conductive connection structure 3. The fan light body 2 can be connected to the suspension bracket seat 1 through the extension rod 5. Thus, the suspension installation of the fan light body 2 has been achieved, and the length of the extension rod 5 can be adjusted according to an actual need to adapt to different heights of ceiling installation. At the same time, the first connection part 50 can be electrically connected to the threaded groove 10, and the second connection part 52 can be electrically connected to the conductive connection structure 3, achieving independent control and power supply of the fan and light, improving the convenience of use. The installation and use of fan light body 2 are more flexible and convenient.

As an optional embodiment, both the first connection part 50 and the second connection part 52 are provided with a connection hole 51, the connection hole 51 is configured to insert the fix member 41, allowing the first connection part 50 and the second connection part 52 to be more firmly connected to the fix member 41, enhancing the stability and firmness of the connection between the fan light body 2 and the suspension bracket seat 1, and improving the installation flexibility and applicability of the fan light body 2.

The above is only a preferred embodiment of the present disclosure and is not intended to limit it. Any modifications, equivalent substitutions, and improvements made within the spirit and principles of the present disclosure shall be included within the protection scope of the present disclosure.

What is claimed is:

1. A fan light, comprising a suspension bracket seat (1) configured to fix and a fan light body (2) connected to the suspension bracket seat (1), wherein the suspension bracket seat (1) is provided with a conductive threaded groove (10), the fan light body (2) is provided with a conductive connection structure (3) that is matched and electrically connected with the threaded groove (10); the suspension bracket seat (1) is further provided with a fixed structure (4) configured to fix the fan light body (2) to the suspension bracket seat (1).

2. The fan light according to claim 1, wherein the fixed structure (4) comprises a through hole (40) located on one side of the suspension bracket seat (1) near the conductive connection structure (3), a fix member (41) located inside the through hole (40) and provided on a top of the conductive connection structure (3).

3. The fan light according to claim 2, wherein the conductive connection structure (3) comprises a conductive body (30) that is threaded with the suspension bracket seat (1), and a fix portion (31) integrally formed with the conductive body (30) and provided at a lower side of the conductive body (30); the fix member (41) runs through the suspension bracket seat (1) and is provided on a top of the fix portion (31).

4. The fan light according to claim 3, wherein the fix portion (31) is further provided with a first fixing hole (310) corresponding to the fix member (41), the first fixing hole (310) is configured to insert the fix member (41); the fix member (41) runs through the through hole (40) and is inserted to the first fixing hole (310).

5. The fan light according to claim 3, wherein the conductive body (30) is any one of B22 light head, E12 light head, E14 light head, E26 light head, and E27 light head.

6. The fan light according to claim 2, wherein the suspension bracket seat (1) further comprises an extension rod (5), one end of the extension rod (5) is provided with a first connection part (50) that can be matched and electrically connected with the threaded groove (10); one end of the extension rod (5) far away from the first connection part (50) is provided with a second connection part (52) that can be matched and electrically connected with the conductive connection structure (3).

7. The fan light according to claim 6, wherein both the first connection part (50) and the second connection part (52) are provided with a connection hole (51), the connection hole (51) is configured to insert the fix member (41).

8. The fan light according to claim 1, wherein the fixed structure (4) is provided with multiple fixed structures, the multiple fixed structures (4) are respectively provided on a periphery of the suspension bracket seat (1).

9. The fan light according to claim 1, wherein the fan light body (2) comprises a fan assembly (21) and a luminous element (22) that can be electrically connected to the conductive connection structure (3) respectively; the fan assembly (21) comprises a casing (210) located on a lower side of the conductive connection structure (3), several fan blades (211) provided on a periphery of the casing (210), a drive component (212) provided in the casing (210) and configured to drive the fan assembly (21) to rotate.

10. The fan light according to claim 9, wherein the drive component (212) comprises a drive motor (6) located within the casing (210), and an installation piece (7) sleeved on the drive motor (6) and configured to fix the drive motor (6) to the casing (210); a control circuit board (8) is further provided on an upper side of the installation piece (7), the drive motor (6) can be electrically connected to the control circuit board (8).

11. The fan light according to claim 10, wherein the installation piece (7) comprises a first installation part (71) located on a lower side of the control circuit board (8) and configured to fix on the casing (210), and a second installation part (72) located on a lower side of the first installation part (71) for inserting and connecting the drive motor (6); the first installation part (71) and the second installation part (72) are integrally formed.

12. The fan light according to claim 11, wherein an insertion hole (721) is provided on the second installation part (72) corresponding to the drive motor (6) and configured to insert the drive motor (6).

13. The fan light according to claim 12, wherein the drive motor (6) comprises a fixed shaft (60) penetrating the insertion hole (721), and a rotation member (61) that rotates around a peripheral side of the fixed shaft (60), the rotation member (61) is fixed to the casing (210) to drive the drive motor (6) to rotate the fan blades (211).

14. The fan light according to claim 11, wherein the first installation part (71) is provided with multiple fixed columns (710), the fixed columns (710) can be fixedly connected to the casing (210); the control circuit board (8) is further provided with a positioning hole (80) corresponding to the fixed column (710) for inserting the fixed column (710).

15. The fan light according to claim 14, wherein a flange (711) extending away from the fixed column (710) is further provided on a periphery of multiple fixed columns (710), a lower side of the control circuit board (8) is provided on the flange (711).

* * * * *